United States Patent
Zhang

(10) Patent No.: US 11,845,891 B2
(45) Date of Patent: Dec. 19, 2023

(54) CHEMICAL SYNTHESIS OF HYBRID INORGANIC-ORGANIC NANOSTRUCTURED CORROSION INHIBITIVE PIGMENTS AND METHODS

(71) Applicant: United Technologies Corporation, Farmington, CT (US)

(72) Inventor: Weilong Zhang, Glastonbury, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 16/444,273

(22) Filed: Jun. 18, 2019

(65) Prior Publication Data
US 2019/0300790 A1    Oct. 3, 2019

Related U.S. Application Data

(62) Division of application No. 14/755,304, filed on Jun. 30, 2015, now Pat. No. 10,323,185.

(60) Provisional application No. 62/019,918, filed on Jul. 2, 2014.

(51) Int. Cl.
| C09K 15/20 | (2006.01) |
| C09C 3/10 | (2006.01) |
| C09C 1/00 | (2006.01) |
| C09K 15/04 | (2006.01) |
| C09K 15/06 | (2006.01) |
| C09K 15/18 | (2006.01) |

(52) U.S. Cl.
CPC ............ *C09K 15/20* (2013.01); *C09C 1/00* (2013.01); *C09C 3/10* (2013.01); *C09K 15/04* (2013.01); *C09K 15/06* (2013.01); *C09K 15/18* (2013.01)

(58) Field of Classification Search
CPC .................................................. C09K 15/06
See application file for complete search history.

(56) References Cited

U.S. PATENT DOCUMENTS

| 4,737,194 A | 4/1988 | Jacobson |
| 6,139,610 A | 10/2000 | Sinko |
| 6,942,899 B2 | 9/2005 | Kendig et al. |
| 7,048,807 B2 | 5/2006 | Stoffer et al. |
| 7,192,639 B2 | 3/2007 | Philipson |
| 7,241,371 B2 | 7/2007 | Stoffer et al. |
| 7,341,677 B2 | 3/2008 | Yu et al. |
| 7,578,878 B2 | 8/2009 | Sinko et al. |
| 7,601,280 B2 | 10/2009 | Kinlen |
| 7,601,425 B2 | 10/2009 | Stoffer et al. |
| 7,662,241 B2 | 2/2010 | Sinko |
| 7,662,312 B2 | 2/2010 | Sinko et al. |
| 7,759,419 B2 | 7/2010 | Stoffer et al. |

(Continued)

FOREIGN PATENT DOCUMENTS

GB    1017475 A    1/1966

*Primary Examiner* — Peter F Godenschwager
(74) *Attorney, Agent, or Firm* — Bachman & LaPointe, P.C.

(57) ABSTRACT

A method for preparing a hybrid inorganic-organic nanostructured inhibitive pigment, includes premixing a first stock solution containing one or more cations and a second stock solution containing one or more oxoanions to form a premixture under pH control in the presence of polymers as surface modifiers. The premixture is then reacted to form a slurry. The slurry is then quenched to separate nanoparticles from the slurry, followed by surface functionalization in organic inhibitors.

7 Claims, 2 Drawing Sheets

(56) References Cited

U.S. PATENT DOCUMENTS

| | | |
|---|---|---|
| 7,794,583 B2 | 9/2010 | Lyublinski |
| 7,883,738 B2 | 2/2011 | Abys et al. |
| 7,935,181 B2 | 5/2011 | Hayes et al. |
| 7,972,655 B2 | 7/2011 | Abys et al. |
| 8,114,206 B2 | 2/2012 | Hayes et al. |
| 8,123,982 B2 | 2/2012 | Ward et al. |
| 8,216,645 B2 | 7/2012 | Abys et al. |
| 8,323,741 B2 | 12/2012 | Abys et al. |
| 8,691,028 B2 | 4/2014 | Kendig et al. |
| 8,703,243 B2 | 4/2014 | Abys et al. |
| 8,741,390 B2 | 6/2014 | Abys et al. |
| 2007/0282075 A1 | 12/2007 | Koch |
| 2008/0255278 A1 | 10/2008 | Futterer et al. |
| 2009/0036585 A1 | 2/2009 | Markmann et al. |
| 2009/0297843 A1 | 12/2009 | Sitthichai et al. |
| 2013/0071453 A1* | 3/2013 | Sojka ............... A61K 8/11 424/401 |
| 2013/0078438 A1 | 3/2013 | Nakajima et al. |
| 2015/0205010 A1* | 7/2015 | Vanier ............... C09D 5/004 252/586 |

\* cited by examiner ated in cations of the present disclosure includes wherein reacting the
CHEMICAL SYNTHESIS OF HYBRID INORGANIC-ORGANIC NANOSTRUCTURED CORROSION INHIBITIVE PIGMENTS AND METHODS

CROSS-REFERENCE TO RELATED APPLICATION

This application is a Divisional of U.S. patent application Ser. No. 14/755,304 filed Jun. 30, 2015, which claims the benefit of provisional application Ser. No. 62/019,918, filed Jul. 2, 2014.

BACKGROUND

The present disclosure relates to corrosion inhibitors and, more particularly, to a method for preparing a hybrid inorganic-organic nanostructured inhibitive pigment.

Metallic components, achieve higher strengths through inclusion of alloying elements. However, the presence of these alloying elements tends to make the alloy vulnerable to corrosion.

Corrosion inhibitive pigments provide a necessary function in protective coatings in the prevention of metal and alloy corrosion. The majority of high-performance pigments are currently based on hexavalent chromate chemistry. Hexavalent chromium may be relatively toxic such that alternatives are in demand. Conventional individual candidates proposed as alternatives to chromate, include rare earth metal cations: $Ce^{3+}$, $Y^{3+}$, $La^{3+}$, $Pr^{3+}$; transition metal oxoanions: $VO_3^-$, $MoO_4^{2-}$, $WO_4^{2-}$, transition metal oxides: $ZrO_2$, $TiO_2$, $NbO_x$, $ZnO_2$, $CoO_x$; non-metal oxoanions: $PO_4^{3-}$, $SiO_3^-$, $B_2O_4^{2-}$; and organic inhibitors of O, N, and S-containing organic molecules. However, none of these have been shown to be as effective as chromate.

SUMMARY

A method for preparing a hybrid inorganic-organic nanostructured inhibitive pigment according to one disclosed non-limiting embodiment of the present disclosure includes premixing a first stock solution containing one or more cations and a second stock solution containing one or more oxoanions to form a premixture in the presence of polymers as surface modifiers; reacting the premixture to form a slurry; quenching the slurry; and separating nanoparticles from the slurry after the quenching.

A further embodiment of the present disclosure includes, wherein the first stock solution includes a $Zn^{2+}$ citric complex solution (1:1).

A further embodiment of any of the foregoing embodiments of the present disclosure includes wherein the first stock solution includes a $Ce^{3+}$ EDTA complex solution (1:1).

A further embodiment of any of the foregoing embodiments of the present disclosure includes wherein the first stock solution includes a $Pr^{3+}$ tartaric complex solution (1:1).

A further embodiment of any of the foregoing embodiments of the present disclosure includes wherein the second stock solution includes a $MoO_4^{2-}$, $PO_4^{3-}$, $SiO_3^-$, mixed with 1-2 w % polymers as surface modifiers.

A further embodiment of any of the foregoing embodiments of the present disclosure includes controlling the pH of the premixture between 8-10 pH.

A further embodiment of any of the foregoing embodiments of the present disclosure includes wherein reacting the premixture to form the slurry is performed as a hydrothermal process.

A further embodiment of any of the foregoing embodiments of the present disclosure includes wherein quenching the slurry includes cooling with distilled water.

A further embodiment of any of the foregoing embodiments of the present disclosure includes wherein separating the nanoparticles from the slurry is performed with a membrane filter followed by surface functionalization in organic inhibitors.

A further embodiment of any of the foregoing embodiments of the present disclosure includes washing the nanoparticles with distilled water.

A further embodiment of any of the foregoing embodiments of the present disclosure includes dispersing the nanoparticles in organic inhibitors for surface functionalization after washing.

A further embodiment of any of the foregoing embodiments of the present disclosure includes wherein the cations include at least one of a rare earth and transition metal cations.

A further embodiment of any of the foregoing embodiments of the present disclosure includes, wherein the oxoanions includes at least one of a transition metal and a nonmetal.

A further embodiment of any of the foregoing embodiments of the present disclosure includes wherein the polymer includes at least one of a polyacrylic acid (PAA) and a polyvinyl alcohol (PVA).

A hybrid inorganic-organic nanostructured inhibitive pigment, according to another disclosed non-limiting embodiment of the present disclosure includes two or more corrosion inhibitive species in an inorganic core, organic shell nanoparticle from a metal-ion-ligand/complex-polymer based precursor solution.

A further embodiment of any of the foregoing embodiments of the present disclosure includes, wherein the metal ions complexed with a chelating agent.

A further embodiment of any of the foregoing embodiments of the present disclosure includes, wherein the chelating agent include an organic amines.

A further embodiment of any of the foregoing embodiments of the present disclosure includes, wherein the organic amines include diethanolamine (DEA).

A further embodiment of any of the foregoing embodiments of the present disclosure includes, wherein the organic amines include triethanolanine (TEA).

A further embodiment of any of the foregoing embodiments of the present disclosure includes, wherein the chelating agent includes an organic acid.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the dis

DETAILED DESCRIPTION

Figure 1:
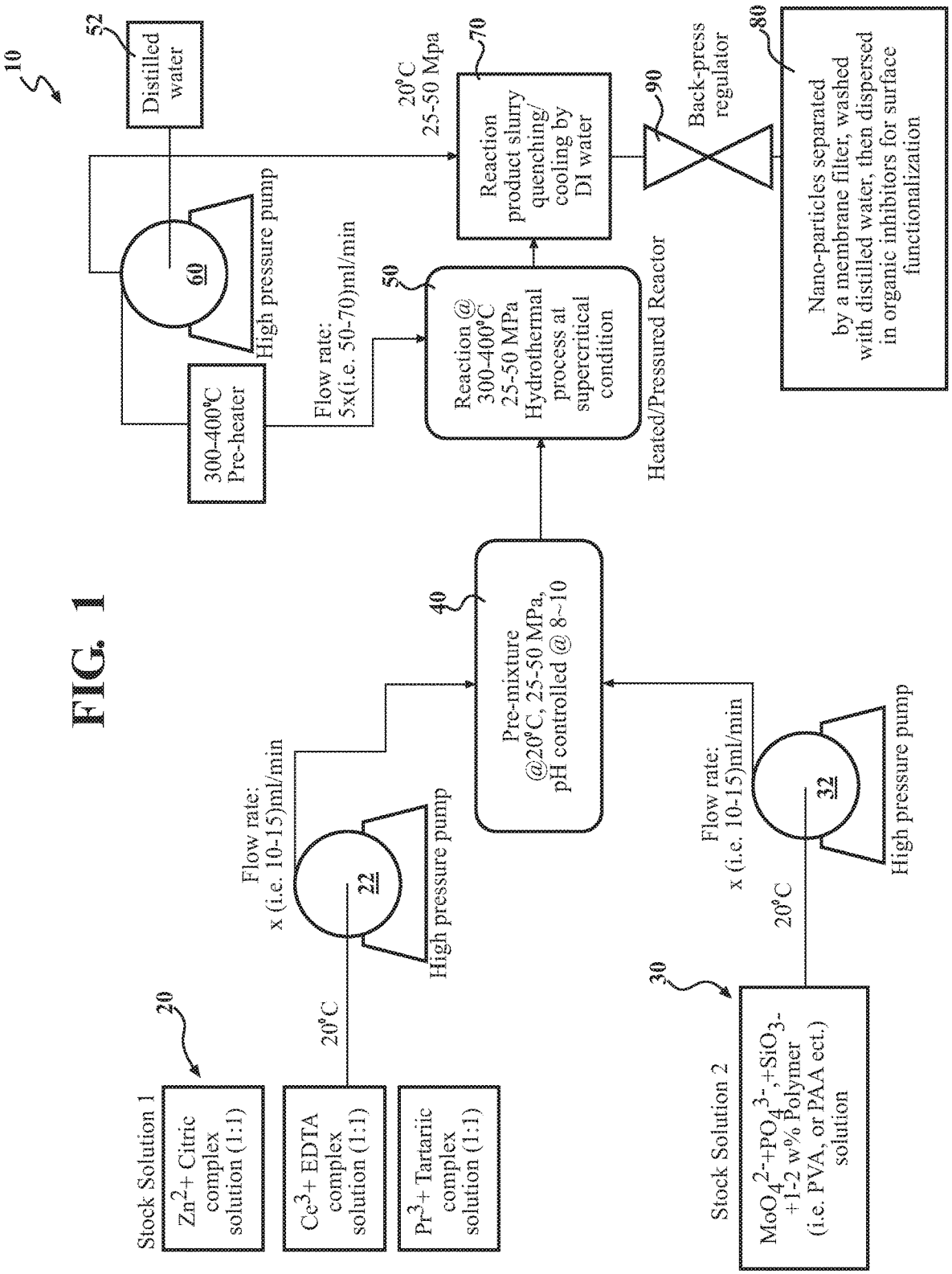
- FIG. 1 is a schematic of a hydrothermal process for hybrid inorganic-organic nanostructured inhibitive pigments.
Figure 2:
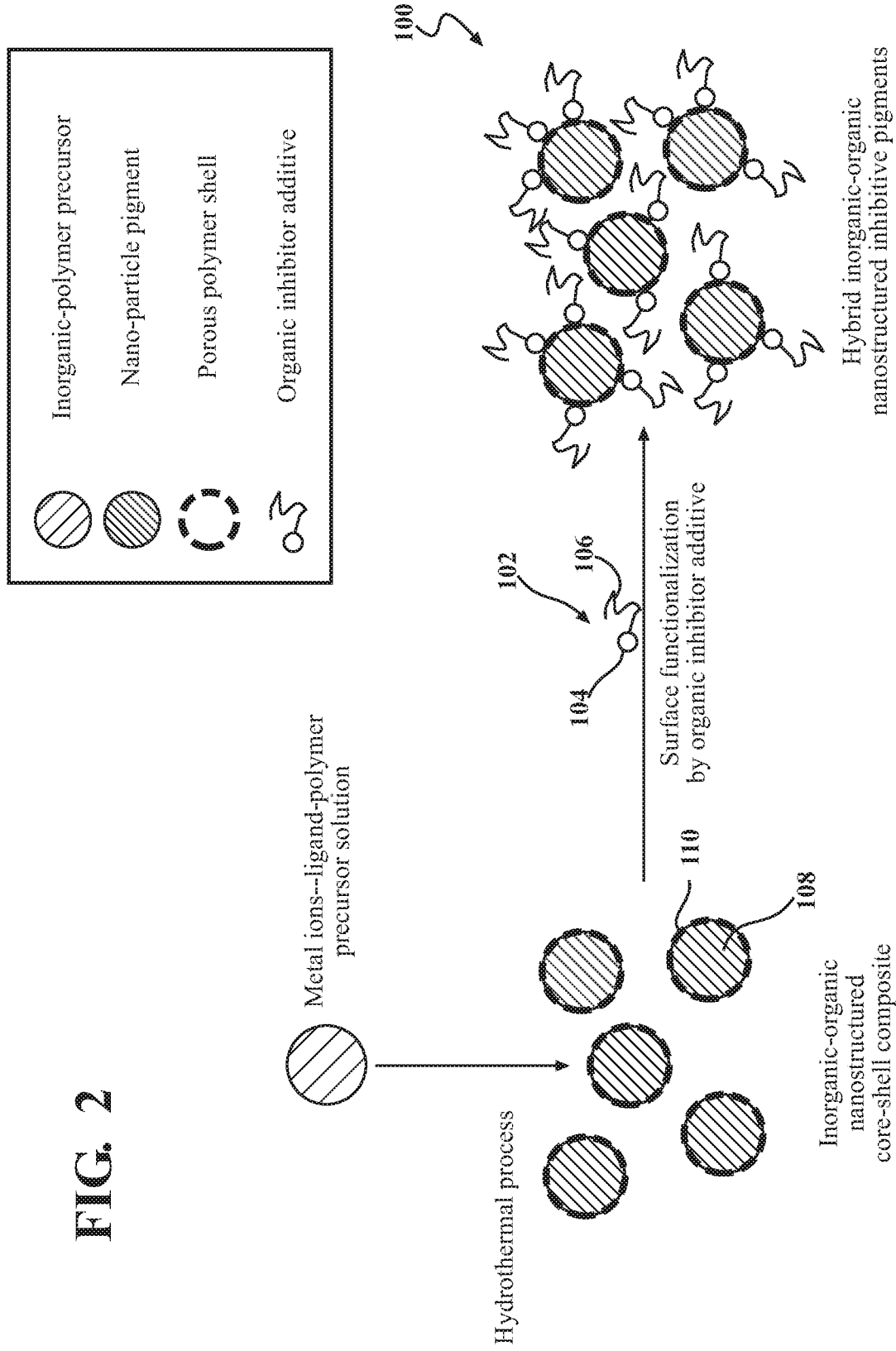
FIG. 2 is a schematic of the synthesis of inorganic (core) and organic (shell) nanostructures for preparing a hybrid inorganic-organic nanostructured inhibitive pigment.

FIG. 1 schematically illustrates a hydrothermal process 10 for preparation of a hybrid inorganic-organic (core-shell) nanostructured inhibitive pigment 100 (FIG. 2). The preparation of the hybrid inorganic-organic nanostructured inhibitive pigment 100 is via a chemical precipitation process, in combination with in-situ follow-up surface modification processes, i.e. polymer surfactants, pH control and organic inhibitors that provide an effective chromate alternative.

Initially, at least a first stock solution 20, such as, for example only, zinc ($Zn^{2+}$) citric complex solution (1:1), cerium ($Ce^{3+}$) EDTA complex solution (1:1), or praseodymium ($Pr^{3+}$) tartaric complex solution (1:1) is premixed with a second stock solution 30, as an example, such as molybdate ($MoO_4^{2-}$), phosphate ($PO_4^{3-}$), silicate ($SiO_3^-$), added with 1-2 w % polymers, such as polyacrylic acid (PAA) and Polyvinyl alcohol (PVA). The precursor solutions include the desired metal ions complexed with a chelating agent, and metal-oxide anions dispersed in polymer/surfactants (surface modifiers). The chelating agents include organic amines such as diethanolamine (DEA), and triethanolanine (TEA), as well as organic acids such as citric/oxalic/tartaric acid, etc. That is, two or more corrosion inhibitive species (i.e. $Ce^{3+}$, $Pr^{3+}$, $Zn^{2+}$, $VO_3^-$, $MoO_4^{2-}$, $PO_4^{3-}$, $SiO_3^-$ and organic molecules, etc.) are incorporated in the form of the inorganic (core)-organic (shell) nanoparticles as inhibitive pigments, prepared from metal-ion-ligand/complex-polymer based precursor solutions.

The first stock solution 20 and the second stock solution 30 are, for example, communicated through respective high pressure pumps, 22, 32 to premix at a controlled pH 40. In this disclosed non-limiting embodiment, the flow rate is about 10-15 ml/min flow at 20° C. such that the pre-mixture is at 20° C., 25-50 MPa with the pH controlled to about 8-10 pH.

The premixed solution is then reacted in a heated and pressurized reactor 50. In this disclosed non-limiting embodiment, the premixed solution is heated and pressurized with distilled water 52 at about 300° C.-400° C., 25-50 MPa to generate a hydrothermal process at a supercritical condition. The distilled water 52 is communicated through a high pressure pump 60 which, in this disclosed non-limiting embodiment, is at about 300° C.-400° C. at a flow rate of about, 50-70 ml/min.

The reacted premixed solution produces a reaction product slurry 70 that is quenched and cooled by the distilled water 52. In this disclosed non-limiting embodiment, the distilled water is supplied at about 20° C., 25-50 MPa.

The nanoparticles are then separated by a membrane filter, washed with distilled water, then dispersed in organic inhibitors for surface functionalization to provide the hybrid inorganic-organic nanostructured inhibitive pigment 100 (FIG. 2). A back-pressure regulator 90 may be utilized to control the separation.

The chemical nature of the polymer/surfactant modified inorganic precursor core 108 with the organic porous polymer shell 110 (FIG. 2) composites allows combination with organic inhibitor additives 102 (FIG. 2) to produce the hybrid inorganic-organic nanostructured inhibitive pigment 100. The organic inhibitor additives include amphiphilic molecules composed of a hydrophilic or polar moiety known as head 104 and a hydrophobic or nonpolar moiety known as tail 106.

Example organic inhibitor additives include, but are not limited to: 4,5-Diamino-2,6-dimercaptopyrimidine ($C_4H_6N_4S_2$); 4,5-Diaminopyrimidine ($C_4H_6N_4$); Sodium diethyldithiocarbamate (($C_2H_5$)$_2$NCSSNa); 2-Mercaptopyridine ($C_5H_5NS$); Thiophenol ($C_6H_5SH$); 4-mercaptobenzoate ($C_7H_5O_2S$); 2-mercaptobenzoate ($C_7H_5O_2S$); 6-Mercaptonicotinate ($C_6H_5NO_2S$); 2-Mercaptonicotinate ($C_6H_5NO_2S$); 2-mercaptosuccinate ($C_4H_4O_4S$); mercaptoacetate ($C_2H_3O_2S$); Sodium-mercaptopropionate ($C_3H_5NaO_2S$).

Example polymers/surfactants include: acetylacetone polyacrylamide (PAM); phosphonate-polyethylene glycol (PEG); and polyacrylic acid (PAA), propylamine phosphonate-polyethylene glycol (PEG); sulfonated acylate copolymer; polyvinyl pyrrolidone (PVP); and hydroxypropylcellulose (HPC).

The hydrothermal process 10 provides one approach to synthesize a hybrid inorganic-organic nanostructured inhibitive pigments, having multiple corrosion protection modes for use as a chromate replacement. The nano-sized pigments reduce costs and improve coating performance as one challenge in applying nano-sized particles as pigments is the strong aggregation during their synthesis process commonly observed in nanoparticles that have been produced from the liquid phase. This agglomeration is, readily resolved by use of the disclosed in-situ surface modification technique during the pigment synthesis process.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A hybrid inorganic-organic nanostructured inhibitive pigment formed by a hydrothermal process, comprising:
    two or more corrosion inhibitive species incorporated in the form of nanoparticles wherein the corrosion inhibitive species comprise one or more rare earth or transition metal cation nanoparticles that are uniformly distributed with an organic inhibitor and one or more oxyanion nanoparticles that are uniformly distributed with the organic inhibitor,
    the one or more rare earth or transition metal cation nanoparticles are selected from the group consisting of $Zn^{2+}$, $Ce^{3+}$, $Pr^{3+}$ and combinations thereof;
    the one or more oxyanion nanoparticles comprise at least one of $MoO_4^{2-}$, $PO_4^{3-}$, and $SiO_3^-$;
    the organic inhibitor comprises at least one of 4,5-Diamino-2,6-dimercaptopyrimidine; 4,5-Diaminopyrimidine; Sodium diethyldithiocarbamate; 2-Mercaptopyridine; Thiophenol; 4-mercaptobenzoate;

2-mercaptobenzoate; 6-Mercaptonicotinate; 2-Mercaptonicotinate; 2-mercaptosuccinate; mercaptoacetate; and Sodium-mercaptopropionate.

2. The hybrid inorganic-organic nanostructured inhibitive pigment as recited in claim 1, wherein the organic inhibitor include amphiphilic molecules composed of a hydrophilic or polar moiety known as head and a hydrophobic or nonpolar moiety known as tail.

3. The hybrid inorganic-organic nanostructured inhibitive pigment as recited in claim 1, wherein the two or more corrosion inhibitive species are prepared from metal-ion-ligand/complex-polymer based precursor solutions via the hydrothermal process in combination with an in-situ follow-up surface modification processes with polymer surfactants.

4. The hybrid inorganic-organic nanostructured inhibitive pigment as recited in claim 3, wherein the polymer surfactants consist of at least one of acetylacetone polyacrylamide (PAM); phosphonate-polyethlene glycol (PEG); polyacrylic acid (PAA); propylamine phosphonate-polyethlene glycol (PEG); sulfonated acylate copolymer; polyvinyl pyrrolidone (PVP); and hydroxypropylcellulose (HPC).

5. The hybrid inorganic-organic nanostructured inhibitive pigment as recited in claim 1, wherein the nanoparticles are surface functionalized.

6. The hybrid inorganic-organic nanostructured inhibitive pigment as recited in claim 1, wherein the nanoparticles comprise an inorganic core and a porous polymer shell, and wherein the porous polymer shell is functionalized with the organic inhibitor.

7. A hybrid inorganic-organic nanostructured inhibitive pigment, comprising:
- two or more corrosion inhibitive species incorporated in the form of nanoparticles wherein the corrosion inhibitive species comprise one or more rare earth or transition metal cation nanoparticles and one or more oxyanion nanoparticles, wherein the nanoparticles comprise an inorganic shell having a porous polymer shell, and wherein a surface of the porous polymer shell is functionalized with an organic inhibitor,
- the one or more rare earth or transition metal cation nanoparticles are selected from the group consisting of $Zn^{2+}$, $Ce^{3+}$, $Pr^{3+}$ and combinations thereof;
- the one or more oxyanion nanoparticles comprise at least one of $MoO_4^{2-}$, $PO_4^{3-}$, and $SiO_3^{-}$;
- the organic inhibitor comprises at least one of 4,5-Diamino-2,6-dimercaptopyrimidine; 4,5-Diaminopyrimidine; Sodium diethyldithiocarbamate; 2-Mercaptopyridine; Thiophenol; 4-mercaptobenzoate; 2-mercaptobenzoate; 6-Mercaptonicotinate; 2-Mercaptonicotinate; 2-mercaptosuccinate; mercaptoacetate; and Sodium-mercaptopropionate.

\* \* \* \* \*